(12) United States Patent
Monaco et al.

(10) Patent No.: US 10,915,654 B2
(45) Date of Patent: *Feb. 9, 2021

(54) DATA LOSS PREVENTION

(71) Applicant: NOBLIS, INC., Reston, VA (US)

(72) Inventors: Matthew K. Monaco, Reston, VA (US); Daniel Negron, Reston, VA (US); Brian Satira, Reston, VA (US)

(73) Assignee: NOBLIS, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,338

(22) Filed: Jun. 21, 2019

(65) Prior Publication Data
US 2019/0318120 A1 Oct. 17, 2019

Related U.S. Application Data

(63) Continuation of application No. 15/394,542, filed on Dec. 29, 2016, now Pat. No. 10,331,902.

(51) Int. Cl.
*G06F 16/17* (2019.01)
*G06F 3/06* (2006.01)
(Continued)

(52) U.S. Cl.
CPC .......... *G06F 21/6227* (2013.01); *G06F 3/064* (2013.01); *G06F 3/0608* (2013.01);
(Continued)

(58) Field of Classification Search
CPC ............. G06F 21/6227; G06F 21/6245; G06F 16/1727; G06F 3/064; G06F 3/0608; G06F 2221/2107; H04L 63/20; H04L 63/1441

See application file for complete search history.

(56) References Cited

U.S. PATENT DOCUMENTS 5,832,526 A 11/1998 Schuyler
5,860,132 A 1/1999 Carter et al.
(Continued)

OTHER PUBLICATIONS

Monaco et al., U.S. Office Action dated Nov. 2, 2017, directed to U.S. Appl. No. 15/394,542; 17 pages.
(Continued)

*Primary Examiner* — Nelson S. Giddins
(74) *Attorney, Agent, or Firm* — Morrison & Foerster LLP

(57) ABSTRACT

Techniques for providing data loss prevention, including data exfiltration prevention and crypto-ransomware prevention, are provided. In some embodiments, a slack-space file system is created by using a modified packing algorithm to increase and/or optimize an amount of slack space created by files stored in a standard file system. A program for accessing and indexing the slack-space file system may be stored, and requests by a user to store data on a storage medium of a computer system may cause the information to be stored in the slack-space file system, where it may be protected from destructive malware that operates solely on the standard file system. In some embodiments, sensitive information may be hidden by storing the information in an alternate data stream of a file and by replacing the information in the unnamed data stream of the file with non-sensitive information that may appear to be sensitive.

22 Claims, 3 Drawing Sheets

(51) Int. Cl.
  *H04L 29/06* (2006.01)
  *G06F 21/62* (2013.01)

(52) U.S. Cl.
  CPC ...... *G06F 16/1727* (2019.01); *H04L 63/1441* (2013.01); *G06F 21/6245* (2013.01); *G06F 2221/2107* (2013.01)

(56) References Cited

U.S. PATENT DOCUMENTS

| | | |
|---|---|---|
| 8,156,303 B2 | 4/2012 | Barrall |
| 8,156,306 B1 | 4/2012 | Raizen et al. |
| 9,317,213 B1 | 4/2016 | Gupta et al. |
| 9,400,609 B1 | 7/2016 | Randall et al. |
| 9,792,298 B1 | 10/2017 | Taylor et al. |
| 2003/0176993 A1 | 9/2003 | Lines et al. |
| 2008/0154928 A1 | 6/2008 | Bashyam et al. |
| 2008/0228998 A1 | 9/2008 | Colecchia et al. |
| 2009/0190760 A1 | 7/2009 | Bojinov et al. |
| 2010/0082537 A1 | 4/2010 | Lasser |
| 2010/0332401 A1 | 12/2010 | Prahlad et al. |
| 2011/0047618 A1 | 2/2011 | Evans et al. |
| 2011/0153697 A1 | 6/2011 | Nickolov et al. |
| 2012/0079596 A1 | 3/2012 | Thomas et al. |
| 2012/0239896 A1 | 9/2012 | Sobel |
| 2015/0006891 A1 | 1/2015 | Tang |
| 2015/0019813 A1 | 1/2015 | Loh et al. |
| 2015/0019834 A1 | 1/2015 | Loh et al. |
| 2015/0095574 A1 | 4/2015 | Bisht et al. |
| 2015/0227468 A1 | 8/2015 | Berger |
| 2016/0110112 A1 | 4/2016 | Yeh |
| 2016/0291877 A1 | 10/2016 | Higuchi et al. |
| 2016/0306583 A1 | 10/2016 | Yun et al. |
| 2016/0328415 A1 | 11/2016 | Bagal et al. |
| 2016/0335188 A1 | 11/2016 | Romanovskiy |
| 2016/0371190 A1 | 12/2016 | Romanovskiy |
| 2017/0039367 A1 | 2/2017 | Ionescu et al. |
| 2017/0083997 A1 | 3/2017 | Gruber et al. |
| 2017/0148264 A1 | 5/2017 | Pichette et al. |
| 2018/0089206 A1 | 3/2018 | Tamura et al. |
| 2018/0089216 A1* | 3/2018 | Boutnaru ............ G06F 16/1734 |
| 2018/0246646 A1* | 8/2018 | Karkkainen ............ G06F 3/064 |

OTHER PUBLICATIONS

Monaco et al., U.S. Office Action dated May 23, 2018, directed to U.S. Appl. No. 15/394,542; 17 pages.

Monaco et al., U.S. Office Action dated Sep. 10, 2018, directed to U.S. Appl. No. 15/394,542; 15 pages.

\* cited by examiner

200

---

202
Implement packing algorithm to control location of stored files and presence of slack space not occupied by stored files

204
Replace default packing algorithm with modified packing algorithm configured to create more slack space than default packing algorithm

---

206
Create slack-space file system for storing files in slack space

208
Store slack-space file system program as compressed, encrypted binary in registry, wherein program comprises index of slack-space file system and is configured to store and retrieve filed from slack-space file system

210
Erase pointers indicating slack-space file system program in process list

212
Store loader program to call slack-space file-system program, wherein loader program is stored as DLL associated with legitimate operating-system DLL

---

214
Store file in slack-space file system

FIG. 2

DATA LOSS PREVENTION

CROSS-REFERENCE TO RELATED APPLICATIONS

This application is a continuation application of U.S. application Ser. No. 15/394,542 filed Dec. 29, 2016, the entire contents of which is incorporated herein by reference.

FIELD OF THE INVENTION

The present disclosure relates generally to network security and, more specifically, to data loss prevention.

BACKGROUND OF THE INVENTION

In network security, known anomaly detection and data loss detection systems may provide notifications to network administrators that anomalies have been detected or that information has been exfiltrated. However, known systems offer inadequate solutions for actually thwarting exfiltration attempts such that malicious actors are unsuccessful at moving data off of a network or system. Accordingly, improved methods for data loss prevention that thwart attempts to exfiltrate data are needed.

Additionally, known techniques for data loss detection and prevention may provide inadequate protection against destructive wiper malware and/or crypto-ransomware, which may destroy, encrypt, or otherwise compromise the integrity of data stored on a system (rather than merely trying to copy the data off-system). Accordingly, there is a need for improved techniques of preventing destructive wiper malware and crypto-ransomware from destroying or compromising data stored in a system.

Thus, there is a need for improved systems, methods, and techniques of providing network security, data exfiltration prevention, and data loss prevention.

SUMMARY OF THE INVENTION

As described above, there is a need for improved systems, methods, and techniques of providing network security, data exfiltration prevention, and data loss prevention.

Particularly, there is a need for improved techniques of preventing destructive wiper malware and crypto-ransomware from destroying or compromising data stored in a system. Described herein are techniques for protecting data from being compromised or destroyed by implementing a slack-space storage system. As discussed herein, creating the slack-space storage system may include modifying one or more packing algorithms or packing techniques of a system in order to create additional slack space and may include methods for ensuring the slack-space file system is persistently executed and evades detection both of legitimate system users and of malicious actors.

Additionally, there is a particular need for improved methods for data loss prevention that thwart attempts to exfiltrate data. Described herein are techniques for preventing attempts to exfiltrate data from a system by storing secure information in alternate data streams.

Described herein are methods, systems, and techniques for providing network security, data exfiltration prevention, and data loss/destruction prevention.

In some embodiments, a first computer system for storing data is provided, wherein the system comprises one or more processors; and memory storing one or more programs configured to be executed by the one or more processors, the one or more programs including instructions for: implementing a packing algorithm configured to store files in a first file system to increase an amount of slack space on a storage medium; receiving a request to store data on the storage medium; and, in response to receiving the request: determining, based on an index of files that are stored in the slack space, a location in the slack space on the storage medium in which to store the data; and storing the data at the determined location in the slack space.

In some embodiments of the first computer system, the index of files is stored, along with instructions for storing and reading files from the slack space, as a slack-space file-system program.

In some embodiments of the first computer system, the slack-space file-system program is stored in a registry of the system.

In some embodiments of the first computer system, the slack-space file-system program is encrypted and compressed.

In some embodiments of the first computer system, the one or more programs include instructions for initializing the slack-space file-system program via a loader program, wherein the loader program is stored as a library of the system.

In some embodiments of the first computer system, the loader program is stored as a first dynamic-link library.

In some embodiments of the first computer system, the loader program is configured to be executed when the first dynamic-link library is called by a second dynamic-link library.

In some embodiments, a first method for storing data, performed at a computer system comprising one or more processors and memory, is provided, wherein the method comprises: implementing a packing algorithm configured to store files in a first file system to increase an amount of slack space on a storage medium; receiving a request to store data on the storage medium; and, in response to receiving the request: determining, based on an index of files that are stored in the slack space, a location in the slack space on the storage medium in which to store the data; and storing the data at the determined location in the slack space.

In some embodiments of the first method, the index of files is stored, along with instructions for storing and reading files from the slack space, as a slack-space file-system program.

In some embodiments of the first method, the slack-space file-system program is stored in a registry of the system.

In some embodiments of the first method, the slack-space file-system program is encrypted and compressed.

In some embodiments of the first method, the first method comprises initializing the slack-space file-system program via a loader program, wherein the loader program is stored as a library of the system.

In some embodiments of the first method, the loader program is stored as a first dynamic-link library.

In some embodiments of the first method, the loader program is configured to be executed when the first dynamic-link library is called by a second dynamic-link library.

In some embodiments, a first non-transitory computer-readable storage medium is provided, the first non-transitory computer-readable storage medium storing one or more programs configured to be executed by one or more processors of a device with one or more processors and memory, the one or more programs including instructions for: implementing a packing algorithm configured to store files in a first file system to increase an amount of slack space on a storage medium; receiving a request to store data on the storage medium; an in response to receiving the request: determining, based on an index of files that are stored in the slack space, a location in the slack space on the storage medium in which to store the data; and storing the data at the determined location in the slack space.

In some embodiments of the first non-transitory computer-readable storage medium, the index of files is stored, along with instructions for storing and reading files from the slack space, as a slack-space file-system program.

In some embodiments of the first non-transitory computer-readable storage medium, the slack-space file-system program is stored in a registry of the system.

In some embodiments of the first non-transitory computer-readable storage medium, the slack-space file-system program is encrypted and compressed.

In some embodiments of the first non-transitory computer-readable storage medium, the one or more programs include instructions for initializing the slack-space file-system program via a loader program, wherein the loader program is stored as a library of the system.

In some embodiments of the first non-transitory computer-readable storage medium, the loader program is stored as a first dynamic-link library.

In some embodiments of the first non-transitory computer-readable storage medium, the loader program is configured to be executed when the first dynamic-link library is called by a second dynamic-link library.

In some embodiments, a second computer system for storing sensitive data in an alternate data stream is provided, the second computer system comprising: one or more processors; and memory storing one or more programs configured to be executed by the one or more processors, the one or more programs including instructions for: storing sensitive data in an alternate data stream of a file; storing non-sensitive data in an unnamed data stream of the file, wherein the non-sensitive data comprises one or more indicators that the non-sensitive data includes sensitive data that is not included in the non-sensitive data.

In some embodiments of the second computer system, the one or more programs include instructions for removing a copy of the sensitive data from the unnamed data stream of the file.

In some embodiments of the second computer system, the one or more indicators comprise content generated based on content of genuine documents related to a subject matter of the sensitive information.

In some embodiments of the second computer system, the one or more programs include instructions for: receiving a request from a user to copy the file to first location in a file system on which the file is stored; and in response to receiving the request, copying the sensitive data in the alternate data stream and the non-sensitive data in the unnamed data stream to the first location.

In some embodiments of the second computer system, the one or more programs include instructions for: receiving a request from a user to copy the file to a second location outside a file system on which the file is stored; and in response to receiving the request, copying the non-sensitive data in the unnamed data stream without copying the sensitive data in the alternate data stream to the first location.

In some embodiments, a second method for storing data in a slack-space file system, performed at a computer system comprising one or more processors and memory, is provided, the method comprising: storing sensitive data in an alternate data stream of a file; storing non-sensitive data in an unnamed data stream of the file, wherein the non-sensitive data comprises one or more indicators that the non-sensitive data includes sensitive data that is not included in the non-sensitive data.

In some embodiments of the second method, the second method comprises removing a copy of the sensitive data from the unnamed data stream of the file.

In some embodiments of the second method, the one or more indicators comprise content generated based on content of genuine documents related to a subject matter of the sensitive information.

In some embodiments of the second method, the second method comprises: receiving a request from a user to copy the file to first location in a file system on which the file is stored; and in response to receiving the request, copying the sensitive data in the alternate data stream and the non-sensitive data in the unnamed data stream to the first location.

In some embodiments of the second method, the second method comprises: receiving a request from a user to copy the file to a second location outside a file system on which the file is stored; and in response to receiving the request, copying the non-sensitive data in the unnamed data stream without copying the sensitive data in the alternate data stream to the first location.

In some embodiments, a second non-transitory computer-readable storage medium is provided, the second non-transitory computer-readable storage medium storing one or more programs configured to be executed by one or more processors of a device with one or more processors and memory, the one or more programs including instructions for: memory storing one or more programs configured to be executed by the one or more processors, the one or more programs including instructions for: storing sensitive data in an alternate data stream of a file; storing non-sensitive data in an unnamed data stream of the file, wherein the non-sensitive data comprises one or more indicators that the non-sensitive data includes sensitive data that is not included in the non-sensitive data.

In some embodiments of the second non-transitory computer-readable storage medium, the one or more programs including instructions for removing a copy of the sensitive data from the unnamed data stream of the file.

In some embodiments of the second non-transitory computer-readable storage medium, the one or more indicators comprise content generated based on content of genuine documents related to a subject matter of the sensitive information.

In some embodiments of the second non-transitory computer-readable storage medium, the one or more programs include instructions for: receiving a request from a user to copy the file to first location in a file system on which the file is stored; and in response to receiving the request, copying the sensitive data in the alternate data stream and the non-sensitive data in the unnamed data stream to the first location.

In some embodiments of the second non-transitory computer-readable storage medium, the one or more programs include instructions for: receiving a request from a user to copy the file to a second location outside a file system on which the file is stored; and in response to receiving the request, copying the non-sensitive data in the unnamed data stream without copying the sensitive data in the alternate data stream to the first location.

BRIEF DESCRIPTION OF THE DRAWINGS

FIG. 2 shows a flow chart depicting a method for data destruction prevention in accordance with some embodiments.

DETAILED DESCRIPTION OF THE INVENTION

Figure 1:
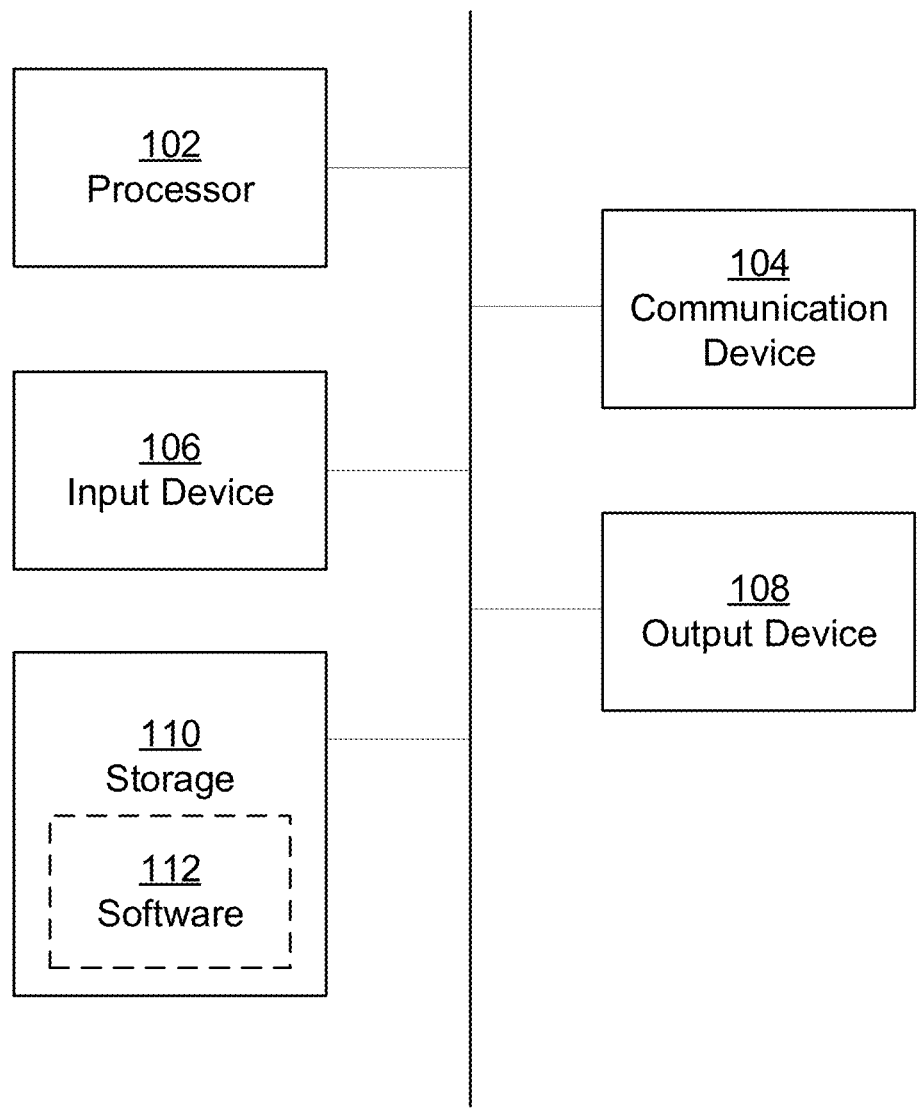
FIG. 1 is an illustration of a computer system, according to certain embodiments.

As described above, there is a need for improved systems, methods, and techniques of providing network security and data loss prevention.

There is a particular need for improved techniques of preventing destructive wiper malware and crypto-ransomware from destroying or compromising data stored in a system.

One solution to this need is to create a slack-space file system to store files and other data in an organized way in slack space of a storage medium. Space available in slack space of a storage medium may be increased by modifying or replacing a packing algorithm that determines locations at which to store files in a conventional file system on the storage medium. By determining locations at which to store files in the conventional file system with an eye toward creating space for a hidden slack-space file system, sufficient space may be created in slack space in order to index and store a substantial number of files in a slack-space file system. In some embodiments, a slack-space file-system program may be stored on the system, where the slack-space file system program includes an index indicating the locations of files stored in the slack-space file system. In some embodiments, measures may be taken in order to make the slack-space file system both inconspicuous and persistent, such that the slack-space file-system program may not be visible to users in a process list of an operating system and such that the slack-space file-system program may be configured to be initialized automatically when standard or common libraries of an operating system are called.

Additionally, there is a particular need for network security techniques that may actually thwart data exfiltration attempts, rather than simply generating an alert when exfiltration is carried out.

One solution to this need is to store sensitive data in alternate data streams of files. In some embodiments, sensitive or secure data may be stored in an alternate data stream (e.g., a data stream other than a standard data stream or other than an unnamed data stream) in a file, which may protect the data from exfiltration in that the data may not be copied off of a system when a malicious actor attempts to compress the file into a compressed format and/or copy the data onto another file system. In some embodiments, the presence of the sensitive or secure data in the alternate data stream may be obscured by storing other data, such as imitation data, in the unnamed data stream. In some embodiments, the imitation data stored in the unnamed data stream may be copied from or otherwise generated based upon information from genuine documents, such as non-sensitive but subject-matter-relevant data that may deceive a malicious actor into believing that the imitation data is genuine sensitive data.

Accordingly, described herein are improved systems, methods, and techniques of providing network security, data loss prevention, and data destruction prevention.

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a", "an", and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes", "including", "comprises", and/or "comprising", when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and, generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms, such as "processing", "computing", "calculating", "determining", "displaying", or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems.

The present disclosure also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Systems for Network Security, Data Loss Prevention, and Anomaly Detection

A system for providing network security, data loss prevention, and data destruction prevention is described below. In some embodiments, the system may include a processor configured to increase and/or optimize slack space in a standard file system on a computer storage medium and to store one or more files in the slack space in accordance with a slack-space file system. The processor may be further configured to implement the slack-space file system via a slack-space file-system program that may be both inconspicuous and persistent, such as by automatically initializing in accordance with libraries of an operating system and in deleting or suppressing reference to the slack-space file-system program in a process list of an operating system.

In some embodiments, the system may include a processor configured to store sensitive information in one or more alternate data streams of one or more files, such as by copying and removing sensitive information from unnamed or standard data streams of a file to one or more alternate data streams of a file, so as to ensure that the data stored in alternate data streams may be prevented from being compressed and or copied to off-system file systems by a malicious actor. In some embodiments, information copied from an unnamed data stream of a file may be replaced with imitation information configured, based on one or more genuine documents, to appear to be genuine sensitive data and to therefore discourage both human and automated malicious actors from continuing to search elsewhere for data to exfiltrate.

An example of a computer system for allocating memory according to some embodiments is illustrated by system 100 in FIG. 1. As shown in FIG. 1, system 100 can be any suitable type of microprocessor-based device, such as a personal computer, workstation, server, handheld computing device, such as a phone or tablet, or distributed computing system (e.g., cloud computing system). The system can include, for example, one or more of processor 102, communication device 104, input device 106, output device 108, storage 110, and/or software 112 stored on storage 110 and executable by processor 102. The components of the computer can be connected in any suitable manner, such as via one or more physical buses or wirelessly.

In some embodiments, system 100 may include server-side computing components as well as client-side computing components. The specific elements shown in FIG. 1 may, in some embodiments, be included in a server-side computer and/or may, in some embodiments, be included in a client-side computer. In some embodiments, system 100 may include server-side components and client-side components that are in communication with one another via one or more instances of communication device 104, which may, for example, enable communication of server-side components and client-side components over a network connection.

In some embodiments, some or all components of system 100 may be part of a distributed computing system (e.g., a cloud computing system). In some embodiments of the techniques disclosed herein, for example, storage 110 may be storage provisioned by a cloud computing system, such that a user may send instructions to the cloud computing system over one or more network connections, and the cloud computing system may execute the instructions in order to leverage the cloud computing components in accordance with the instructions. In some embodiments, cloud computing systems may be configured to be capable of executing the same or similar program code in the same programming languages as other systems (e.g., servers, personal computers, laptops, etc.) as discussed herein.

Processor 102 may be any suitable type of computer processor capable of communicating with the other components of system 100 in order to execute computer-readable instructions and to cause system 100 to carry out actions in accordance with the instructions. For example, processor 100 may access a computer program (e.g., software 112) that may be stored on storage 110 and execute the program to cause the system to perform various actions in accordance with the program. In some embodiments, a computer program or other instructions executed by processor 102 may be stored on any transitory or non-transitory computer-readable storage medium readable by processor 102.

Communication device 104 may include any suitable device capable of transmitting and receiving signals over a network, such as a network interface chip or card. System 100 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Input device 106 may be any suitable device that provides input, such as a touch screen or monitor, keyboard, mouse, button or key or other actuatable input mechanism, microphone, and/or voice-recognition device, gyroscope, camera, or IR sensor. Output device 108 may be any suitable device that provides output, such as a touchscreen, monitor, printer, disk drive, light, speaker, or haptic output device.

Storage 110 can be any suitable device the provides storage, such as an electrical, magnetic or optical memory including a RAM, cache, hard drive, CD-ROM drive, tape drive, or removable storage disk.

Software 112, which may be stored in storage 110 and executed by processor 102, may include, for example, the programming that embodies the functionality of the methods, techniques, and other aspects of the present disclosure (e.g., as embodied in the computers, servers, and devices as described above). In some embodiments, software 112 may include a combination of servers such as application servers and database servers.

Software 112 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 110, that can contain or store programming for use by or in connection with an instruction execution system, apparatus, or device.

Software 112 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

System 100 can implement any one or more operating systems suitable for operating on the network. Software 112 can be written in any one or more suitable programming languages, such as C, C++, Java, or Python. In various embodiments, application software embodying the functionality of the present disclosure can be deployed in different configurations, such as in a client/server arrangement or through a Web browser as a Web-based application or Web service, for example.

Data Destruction Prevention Using Slack-Space File System

In some embodiments, protection of data from destructive wiper malware or crypto-ransomware may be improved by implementing a slack-space file system and storing data in slack space. That is, locations in storage that a conventional file system (e.g., a primary file system associated with an operating system of a device) may interpret as slack space may be used to store data, such that the stored data may not be visible, apparent, or otherwise known to the conventional file system. Accordingly, destructive wiper malware or crypto-ransomware that accesses and operates upon files through the conventional file system may fail to compromise or destroy those files stored in the slack-space file system. As explained below, slack-space file systems may be improved by replacing conventional packing algorithms with packing algorithms configured to create larger amounts of slack space (e.g., configured to not pack files on the conventional file system as tightly as otherwise possible) and by using techniques to obfuscate the fact that a slack-space file system is running and to make programs for accessing the slack-space file system both persistent and transparent to users.

FIG. 2 depicts exemplary method 200 of data destruction prevention in accordance with some embodiments. The method depicted in FIG. 2 may be implemented by a computer system such as system 100 in FIG. 1 described above. Method 200 may, in some embodiments, be combined in whole or in part with other techniques described herein.

At block 202, in some embodiments, the system may implement a packing algorithm to control the locations of stored files and the presence of slack space not occupied by stored files. When a file is stored in computer storage, such as a hard disk or a solid state hard drive, the size of the file stored may be smaller than an amount of space that is allocated on the storage medium for the file. For example, a file may be stored at a location starting at the beginning of a cluster. A cluster may, in some embodiments, be defined as the smallest amount of contiguous space in a storage medium that may be allocated by a file system to be used as storage. If the file stored is smaller than the cluster (or smaller than a plurality of clusters that are allocated for storage of the file), then the storage space between the end of the file, and the end of the cluster (or the end of the last cluster in the plurality of clusters) will be unoccupied slack space.

Computer systems may generally seek to minimize slack space in order to use storage space most efficiently. Accordingly, computer systems may implement one or more algorithms that decide where data should be stored and how space should be allocated for storing said data in computer storage. These algorithms may sometimes be referred to as packing algorithms, in that they may seek to pack files/data of different sizes into different-sized available contiguous storage spaces in the most efficient manner possible, in order to create the least slack space possible. In the example of system 100, the system may implement a packing algorithm to control the locations of stored files and the presence of slack space on storage 110.

At block 204, in some embodiments, implementing a packing algorithm may comprise replacing a default packing algorithm with a modified packing algorithm configured to create more slack space than the default packing algorithm. That is, the implemented packing algorithm may, in some embodiments, be a modified packing algorithm that replaces a default packing algorithm. As explained above, computer systems and packing algorithms may generally seek to minimize slack space in order to use storage space most efficiently. However, in some embodiments, it may be advantageous to increase the amount of slack space in computer storage so that the increased slack space can be used to store a larger number of files in a slack-space storage system. Accordingly, a system such as system 100 may replace a default packing algorithm (e.g., a standard packing algorithm associated with an operating system, such as Windows) with a modified packing algorithm that is configured to create additional slack space. In some embodiments, replacing the default packing algorithm may comprise modifying or changing the default packing algorithm to create the modified packing algorithm. In some embodiments, replacing the default packing algorithm may comprise deleting the default packing algorithm and implementing an entirely new and unrelated packing algorithm as the "modified packing algorithm." In some embodiments, any second packing algorithm may be implemented in addition to or in place of any first packing algorithm, whether or not the second packing algorithm was derived by modifying the first packing algorithm. In some embodiments, more than one packing algorithm may be stored on a system (e.g., stored on storage 110 of system 100), and a system or user may selectively choose which packing algorithm should be implemented at the time that storage is allocated or a file is stored.

At block 206, in some embodiments, the system may create a slack-space file system for storing files in slack space. In some embodiments, when a modified or alternative packing algorithm has been implemented to store files on a standard file system to create an increased amount of slack space in a storage medium, a system may have sufficient space to store an appreciable number of files in slack space on the storage medium. In some embodiments, creating a slack-space file system may include creating and storing one or more programs configured to store files in slack space (e.g., on areas of a storage medium that the standard file system recognizes as slack space), index files stored in slack space, modify files stored in slack space, and/or read and retrieve files stored in slack space.

At block 208, in some embodiments, creating the slack-space file system may comprise storing a slack-space file system program as a compressed, encrypted binary in a registry, wherein the program comprises an index of the slack-space file system and is configured to store and retrieve files from the slack-space file system. In some embodiments, a slack-space file system access program may be any program configured to store, index, modify, read, or retrieve files in or from a slack-space file system, and such a program may include executable instructions for doing so. In some embodiments, a slack-space file system access program may comprise an index or any suitable stored record of files stored in a slack-space file system, such that a system implementing the program or a user accessing the program may look up what files are stored in slack space, and at what locations.

In some embodiments, a slack-space file-system program may be stored in any storage location on a system, such as anywhere in storage 110 on system 100. However, in some embodiments, it may be advantageous for the location of the slack-space file system program to itself be obfuscated, such that a legitimate user and/or malicious actor may not be aware that a slack-space file system exists on a system. In some such embodiments, where obfuscation is desired, a slack-space file-system program may be stored in a location other than a standard location for programs or for standard file-system files to be stored. For example, in some embodiments, the slack-space file-system program may be stored as a key value in a registry of a system, where it may be more likely to escape detection. To further protect the slack-space file system program from begin detected, the program may be stored as a compressed, encrypted binary, such that it is both small in size and may not be readable without successful decryption.

At block 210, in some embodiments, creating the slack-space file system may comprise storing instructions to erase pointers indicating the slack-space file-system program in a process list. In some embodiments, a system may maintain a process list of programs and/or processes currently running or executing on the system. For example, in Windows systems, a user may be able to access a list of active processes through the Task Manager interface. However, in some embodiments, indication of a process may be removed from a process list while the process is still running. In the example of Windows, a pointer indicating a process and causing the process to appear in the process list of the Task Manager may be erased such that the process does not appear in the task manager while the process may continue to execute. Executing instructions to erase pointers indicating the slack-space file-system program in a process list may further decrease visibility of a slack-space file system such that users and/or malicious actors may be less aware of the slack-space file system and less likely to attempt to circumvent or disable the protections that it provides.

At block 212, in some embodiments, the system may store a loader program to call the slack-space file-system program, wherein the loader program is stored as a dynamic-link library (DLL) associated with a legitimate operating-system DLL. In some embodiments, a loader program may comprise any set of instructions configured to call or otherwise initiate execution of the slack-space file-system program. In some embodiments, a loader program may be configured to locate and execute the instructions that constitute the slack-space file-system program. For example, when the slack-space file-system program is stored as a compressed encrypted binary in the registry, the loader program may search through the registry to locate the slack-space file-system program.

In some embodiments, it may be advantageous for the loader program to ensure that the slack-space file-system program is persistently and reliably initiated whenever a system comes online, or at any point if the slack-space file-system program is terminated. One technique for enabling such persistence may be to associate the loader program with a library stored on a system; for example, in Windows systems, the loader program may be configured and stored in such a manner that it is associated with a DLL of the operating system. For example, the loader program may be inserted into a version of a frequently called or frequently used DLL in a Windows system, by replacing the original DLL with a new version of the DLL also including instructions for executing the loader program. In this way, whenever the system attempts to call the original DLL, the loader-program is also instructed to execute, and may thereby ensure that the slack-space file-system program is executing, and may begin executing the slack-space file-system program if it is not already executing.

At block 214, in some embodiments, the system may store a file in the slack-space file system. Once the slack-space file-system program is executing, it may be called by a user or by an automated system process to store a file, and the program may store the file in slack space of the storage medium. In some embodiments, the program may be configured to automatically store a file in the slack-space file system whenever a user requests to store the file, even if the user inputs a request to store the file on the standard file system. For example, in response to receiving a request to store a file on a standard file system, the system may instead store the file in the slack-space file system. In this way, the existence and operation of the slack-space file program may be unknown to legitimate users of a system, such that those users may be less likely to disable the slack-space file system and thereby decrease security.

In some embodiments, the system may make an automatic determination as to whether to store a file in the slack-space file system or in a standard file system, based on one or more criteria. For example, the determination may be made in accordance with file size, space available in one or both file systems, file type, or file content (e.g., whether the file contains secure information, or a level of security of the information contained in the file). In some embodiments, a system may receive a selection from a user as to whether to store a file in the standard file system or in the slack-space file system, and the system may choose which file system to use based on the user's selection.

As discussed above, storing files in slack space may provide protection against destructive wiper malware and crypto-ransomware if the malware or ransomware is configured to operate through a conventional file system. If the malware or ransomware is configured to operate through a conventional file system, then files stored in slack space of the conventional file system (e.g., stored in the slack-space file system instead) may be unknown to the conventional file system and may accordingly be ignored by the malware or ransomware. If the malware is unaware of data stored in slack space and only operates on data recognized by the conventional file system, then the data stored in the slack-space file system may avoid being overwritten, encrypted, destroyed, or otherwise compromised, even if a malicious actor has achieved sufficient system access to compromise data stored in a conventional file system.

Data Exfiltration Prevention Using Alternate Data Streams

In some embodiments, attempts by malicious actors or network intruders to exfiltrate data from a system may be effectively thwarted by utilizing alternate data streams on a New Technology File System. An alternate data stream (ADS) is a feature of files in Windows New Technology File Systems (NTFS) that may contain metadata or other information pertaining to the a file or to the data stored in the primary (e.g., unnamed) data stream of the file. The alternate data stream of a file may be any data stream other than the standard/primary/unnamed data stream, and may in some embodiments be a resource fork that is referenced by an operating system (e.g., Windows) in order to glean information regarding how to interpret information in a data fork of the file (e.g., the unnamed data stream).

By storing sensitive information in an alternate data stream associated with a file, the sensitive information may be shielded from being copied or otherwise moved to a location off of the system or in a different file system, while still preserving on-system functionality. For example, when a malicious actor tries to copy a file to a location outside of its native file system, sensitive information stored in an alternate data stream may not be copied along with the remainder of the file, and the exfiltration of the sensitive information may accordingly be thwarted.

Figure 3:
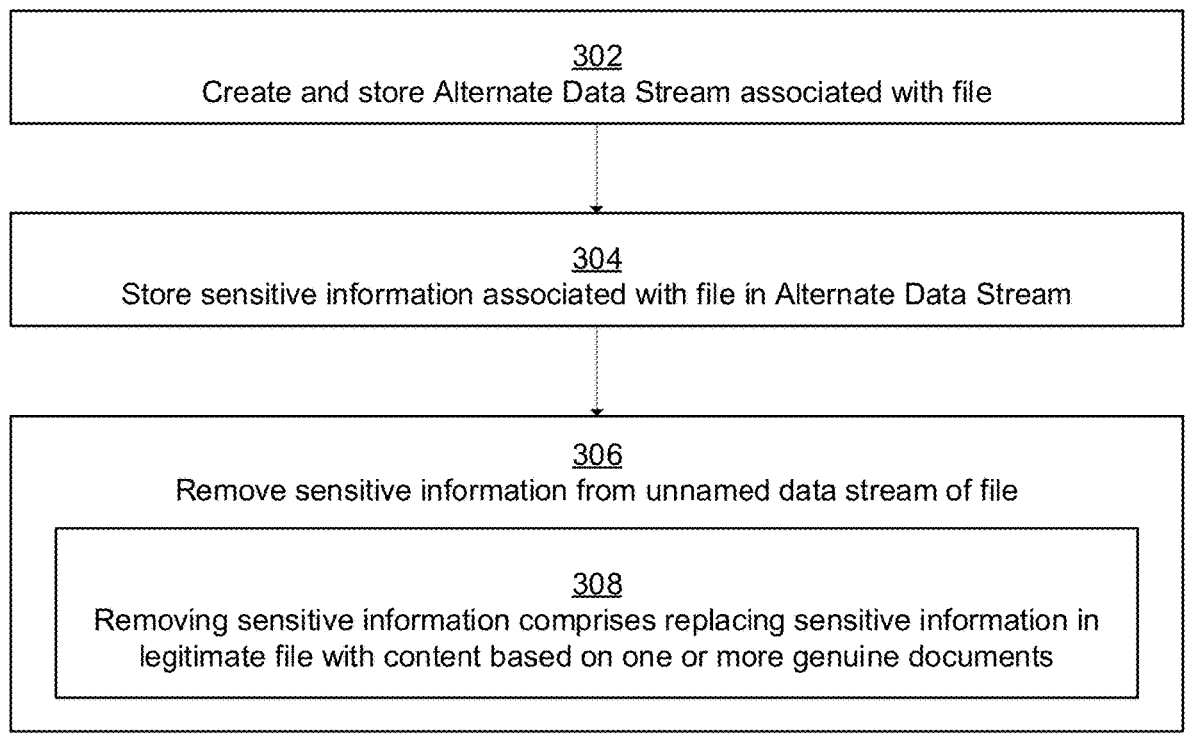
FIG. 3 shows a flow chart depicting a method for data exfiltration prevention in accordance with some embodiments.

FIG. 3 depicts exemplary method 300 of data exfiltration prevention in accordance with some embodiments. The method depicted in FIG. 3 may be implemented by a computer system, such as system 100 in FIG. 1 described above. Method 300 may, in some embodiments, be combined in whole or in part with other techniques described herein.

At block 302, in some embodiments, a system may create and store an alternate data stream associated with a file. The alternate data stream may be created and stored as part of the file, such that data associated with the alternate data stream is stored in the same storage medium as the rest of the file. In the example of system 100, the file, including the alternate data stream created, may be stored on storage 110.

At block 304, in some embodiments, the system may store sensitive information associated with the file in the alternate data stream. In some embodiments, all information already associated with the file (e.g., all data included in the unnamed data stream, also referred to as the standard data stream) may be copied to the alternate data stream. In some embodiments, only select parts of the original file may be copied to the alternate data stream. In some embodiments, sensitive information not otherwise stored in the file may be written into and stored in the alternate data stream of the file. In some embodiments, storing sensitive information in the alternate data stream may comprise determining one or more portions of a data set that are sensitive and should be protected, such as by receiving user input indicating sensitive data or by automatically determining whether data is sensitive (e.g., by analyzing data content or metadata). In some embodiments, a system may automatically store information that is determined to be sensitive in the alternate data stream, while information that is not determined to be sensitive may not be stored in the alternate data stream.

At block 306, in some embodiments, the system may remove sensitive information from the unnamed data stream (which may also be referred to as the standard data stream). In some embodiments, the sensitive information removed from the unnamed data stream of the file may be the same sensitive information that was stored in the alternate data stream associated with the file. In some embodiments, removing sensitive information from the unnamed data stream may comprise wholly or partially deleting the information, wholly or partially overwriting the information, or wholly or partially modifying the information.

At block 308, in some embodiments, removing the sensitive information may comprise replacing the sensitive information with content based on one or more genuine documents. In some embodiments, this technique may be used in addition to other techniques that make information appear to be legitimate, sensitive information, when it is not. A system may, in some embodiments, be configured to include any one or more indicia of sensitivity in data that is not actually sensitive data, including, but not limited to, genuine information taken from genuine documents related to a subject matter believed to be relevant to a potential or known target of a malicious actor. For example, a system may be configured to replace genuine sensitive information in the unnamed data stream of the file with information/content/data based on one or more other files or documents. The information/content/data used to replace the genuine sensitive information may be intended and configured to appear to be sensitive information without actually being so. That is, the information may be faux information (e.g, imitation information or spoof information) designed to give the appearance of legitimacy without actually compromising security.

Making imitation non-sensitive data appear instead to be valuable sensitive data may increase security by providing malicious actors (whether they be automated or human) with information that they believe to be of value, and thereby encouraging them to cease malicious exfiltration operations based on the false belief that their operation has been successful. For example, if sensitive information is merely hidden, malicious actors may continue to look for the sensitive information. However, if sensitive information is hidden and non-sensitive imitation data is provided in its place, then malicious actors may exfiltrate the non-sensitive information and, believing that their operation has been successful, not continue to look for and potentially find the hidden sensitive information.

In some embodiments, content or data stored in the unnamed data stream may be taken from or based on legitimate files and/or documents, and may be useful in making the information in the unnamed data stream appear to be genuine information, thereby making it an enticing target for attempted exfiltration by malicious actors. In some embodiment, content copied directly from another legitimate file or document may be inserted into the unnamed data stream. In some embodiments, content based on legitimate files and/or documents may be inserted into the unnamed data stream in order to attempt to make the unnamed data stream appear to be contain sensitive or secret information. For example, a system may insert text or other data indicating the file as "confidential" or "secret," even if it is not.

In some embodiments, a system may determine words, phrases, sentence structures, document structures, numbers, symbols, and/or images that are indicative of legitimate files or data, and/or of sensitive/secret files or data and may replicate those characteristics in content inserted into the unnamed data stream. Such characteristics may in some embodiments be extracted from a corpus of one or more documents, files, or other data provided by a user of a system. For example, a user of a system may provide a large corpus of dozens or hundreds or thousands of non-confidential documents (e.g., white papers, recently published articles, recently declassified document, news articles, manuals, etc.) to the system, wherein the documents all relate to a subject matter of legitimate files and/or data located on the system, to a subject matter of the secure data stored in the alternate data stream, and/or to a subject matter of potential or suspected interest to malicious actors. (In some embodiments, when a user seeks to divert attention away from a file entirely, the subject matters selected for imitation data included in the unnamed data stream may intentionally be data that does not relate to a subject matter of the sensitive hidden data. This approach may have the advantage of causing a malicious actor to take no interest in the file whatsoever, while choosing subject-matter-relevant information may have the advantage of causing a malicious actor to think that the information in the unnamed data stream is high-value, sensitive target information, and to cease his exfiltration operation once the imitation information is obtained.)

The system may then scan and analyze the corpus of documents in order to extract one or more of the characteristics recited above and may then insert those characteristics into the unnamed data stream. In some embodiments, the system may generate document and/or data content (e.g., text and figures and numbers) from scratch based on the extracted content, while, in some embodiments, the system may start with a template and replace portions of the template or otherwise modify the template based on the characteristics extracted from the corpus of documents. In some embodiments, the template may be an artificial template, while, in some embodiments, the template may be a legitimate document (e.g., one document from the corpus) that the system modifies based on characteristics from other legitimate documents. By inserting content into unnamed data streams based on a corpus of legitimate documents relating to relevant subject matter, the file may be made to appear to be of high value to malicious actors and network intruders and particularly to malicious actors who are not technically skilled in the subject matter or who are leveraging automated tools to scan for keywords or phrases or the like. By making the content of the unnamed data stream more enticing or more likely to be selected by automated systems searching for keywords or phrases, the likelihood of an intruder ceasing an exfiltration operation following exfiltration of the imitation content may be increased, and the legitimate sensitive data stored in the alternate data stream may accordingly be increased.

Method 300 may be advantageous, in some embodiments, because it may hide sensitive data or information in an alternate data stream of a file and may simultaneously provide faux data/content in the unnamed data stream of the file, such that intruders or malicious actors may incorrectly determine that the faux content is legitimate sensitive content. If the intruder or malicious actor is using conventional file browsing techniques and is not using tools to check for the presence of alternate data streams, then the intruder or malicious actor may be unaware of the legitimate sensitive content stored in the alternate data stream. When the intruder or malicious actor then attempts to copy or otherwise exfiltrate the file off of the file system (e.g., by zipping or compressing the file or by moving it to another file system), the unnamed data stream may be successfully exfiltrated while the alternate data stream may not be exfiltrated. Accordingly, a malicious actor may believe that he has successfully exfiltrated sensitive information in the form of the faux content in the unnamed data stream, when, in reality, the genuine sensitive information contained in the alternate data stream of the file will not have been exfiltrated.

In some embodiments, method 300 may be effectively combined with method 200 in order to simultaneously provide effective data destruction prevention along with data exfiltration prevention. For example, sensitive data in a file may be relocated to an alternate data stream in one or more files in accordance with method 300, and the one or more files (and/or one or more other files) may then be stored in a slack-space storage system in accordance with method 200. By providing multiple levels of security, a malicious actor who has breached one level of security may believe that their operation has been successful without realizing that additional security measures are in place. For example, a malicious actor who locates certain data stored in alternate data streams of files stored on a standard file system (which may be sensitive data or may be non-sensitive imitation data) may not realize that sensitive information is stored in a slack-space file system that he has not discovered. Alternately, a user who discovers a slack-space file system may copy files to alternate file systems without realizing the information in the unnamed data streams of the files is imitation information and may accordingly fail to successfully copy and exfiltrate the sensitive information stored in alternate data streams of the files.

The techniques, methods, systems, devices, and/or other aspects disclosed herein may, in some embodiments, optionally be combined in any suitable combination.

What is claimed is:

1. A computer system for storing data, comprising:
one or more processors; and
memory storing one or more programs configured to be executed by the one or more processors, the one or more programs including instructions for:
implementing a packing algorithm configured to store a first set of files in a first file system to create an amount of slack space on a storage medium, wherein the slack space comprises space in the storage medium between the end of a file in the first set of files and the end of a cluster allocated by the first file system to store the file, wherein the cluster is a predetermined minimum amount of contiguous space that can be allocated by the first file system;
receiving a request to store data on the storage medium; and
in response to receiving the request:
determining whether to use the first file system or a second file system to store the data, wherein the second file system is configured to store a second set of files in the slack space of the first file system, wherein determining whether to use the first file system or the second file system is based on one or more of a file size of the data, an amount of storage space available on one or both of the first file system and the second file system, a file type of the data, whether the data contains secure information, and a level of security of information contained in the data;
in response to determining to use the second file system, determining, based on an index of the second set of files that are stored in the slack space, a location in the slack space on the storage medium in which to store the data; and
storing the data at the determined location in the slack space.

2. The system of claim 1, wherein the index of the second set of files is stored, along with instructions for storing and reading the second set of files from the slack space, as a slack-space file-system program.

3. The system of claim 2, wherein the slack-space file-system program is stored in a registry of the system.

4. The system of claim 2, wherein the slack-space file-system program is encrypted and compressed.

5. The system of claim 2, wherein the one or more programs include instructions for initializing the slack-space file-system program via a loader program, and wherein the loader program is stored as a library of the system.

6. The system of claim 5, wherein the loader program is stored as a first dynamic-link library.

7. The system of claim 6, wherein the loader program is configured to be executed when the first dynamic-link library is called by a second dynamic-link library.

8. The system of claim 1, wherein the index of the second set of files that are stored in the slack space of the first file system is inaccessible to the first file system.

9. A method for storing data, performed at a computer system comprising one or more processors and memory, the method comprising:
   implementing a packing algorithm configured to store a first set of files in a first file system to create an amount of slack space on a storage medium, wherein the slack space comprises space in the storage medium between the end of a file in the first set of files and the end of a cluster allocated by the first file system to store the file, wherein the cluster is a predetermined minimum amount of contiguous space that can be allocated by the first file system;
   receiving a request to store data on the storage medium; and
   in response to receiving the request:
      determining whether to use the first file system or a second file system to store the data, wherein the second file system is configured to store a second set of files in the slack space of the first file system, wherein determining whether to use the first file system or the second file system is based on one or more of a file size of the data, an amount of storage space available on one or both of the first file system and the second file system, a file type of the data, whether the data contains secure information, and a level of security of information contained in the data;
      in response to determining to use the second file system, determining, based on an index of the second set of files that are stored in the slack space, a location in the slack space on the storage medium in which to store the data; and
      storing the data at the determined location in the slack space.

10. The method of claim 9, wherein the index of the second set of files is stored, along with instructions for storing and reading the second set of files from the slack space, as a slack-space file-system program.

11. The method of claim 10, wherein the slack-space file-system program is stored in a registry of the system.

12. The method of claim 10, wherein the slack-space file-system program is encrypted and compressed.

13. The method of claim 10, comprising initializing the slack-space file-system program via a loader program, wherein the loader program is stored as a library of the system.

14. The method of claim 13, wherein the loader program is stored as a first dynamic-link library.

15. The method of claim 14, wherein the loader program is configured to be executed when the first dynamic-link library is called by a second dynamic-link library.

16. A non-transitory computer-readable storage medium storing one or more programs configured to be executed by one or more processors of a device with one or more processors and memory, the one or more programs including instructions for:
   implementing a packing algorithm configured to store a first set of files in a first file system to create an amount of slack space on a storage medium, wherein the slack space comprises space in the storage medium between the end of a file in the first set of files and the end of a cluster allocated by the first file system to store the file, wherein the cluster is a predetermined minimum amount of contiguous space that can be allocated by the first file system;
   receiving a request to store data on the storage medium; and
   in response to receiving the request:
      determining whether to use the first file system or a second file system to store the data, wherein the second file system is configured to store a second set of files in the slack space of the first file system, wherein determining whether to use the first file system or the second file system is based on one or more of a file size of the data, an amount of storage space available on one or both of the first file system and the second file system, a file type of the data, whether the data contains secure information, and a level of security of information contained in the data;
      in response to determining to use the second file system, determining, based on the index of a second set of files that are stored in the slack space, a location in the slack space on the storage medium in which to store the data; and
      storing the data at the determined location in the slack space.

17. The non-transitory computer-readable storage medium of claim 16, wherein the index of the second set of files is stored, along with instructions for storing and reading the second files from the slack space, as a slack-space file-system program.

18. The non-transitory computer-readable storage medium of claim 17, wherein the slack-space file-system program is stored in a registry of the system.

19. The non-transitory computer-readable storage medium of claim 17, wherein the slack-space file-system program is encrypted and compressed.

20. The non-transitory computer-readable storage medium of claim 17, the one or more programs including instructions for initializing the slack-space file-system program via a loader program, wherein the loader program is stored as a library of the system.

21. The non-transitory computer-readable storage medium of claim 20, wherein the loader program is stored as a first dynamic-link library.

22. The non-transitory computer-readable storage medium of claim 21, wherein the loader program is configured to be executed when the first dynamic-link library is called by a second dynamic-link library.

* * * * *